(12) United States Patent
Stewart et al.

(10) Patent No.: US 8,197,175 B2
(45) Date of Patent: Jun. 12, 2012

(54) LIGHT-WEIGHT LIVE-FLOOR MODULE FOR TRAILERS

(76) Inventors: Harvey Stewart, Coleman (CA); Darrin Mitchell, Coleman (CA)

( * ) Notice: Subject to any disclaimer, the term of this patent is extended or adjusted under 35 U.S.C. 154(b) by 0 days.

(21) Appl. No.: 12/805,155

(22) Filed: Jul. 15, 2010

(65) Prior Publication Data

US 2011/0142585 A1 Jun. 16, 2011

Related U.S. Application Data

(60) Provisional application No. 61/282,065, filed on Dec. 10, 2009.

(51) Int. Cl.
*B65F 3/28* (2006.01)
*E02F 9/28* (2006.01)
(52) U.S. Cl. ........................................ 414/510; 414/812
(58) Field of Classification Search ................ 414/510, 414/514, 516, 521, 812, 813
See application file for complete search history.

(56) References Cited

U.S. PATENT DOCUMENTS

| | | | |
|---|---|---|---|
| 482,785 A * | 9/1892 | Compton | 414/510 |
| 2,606,677 A | 8/1952 | Snedeger | |
| 2,890,803 A | 6/1959 | Vanier et al. | |
| 3,272,358 A | 9/1966 | Thompson | |
| 3,333,574 A * | 8/1967 | Harris | 119/57.92 |
| 3,498,482 A | 3/1970 | Lewis | |
| 3,593,864 A | 7/1971 | Moser | |
| 3,704,798 A | 12/1972 | Carpenture, Jr. | |
| 3,722,717 A | 3/1973 | Stryczek | |
| 3,888,366 A | 6/1975 | Prahst | |
| 3,953,170 A | 4/1976 | Webb | |
| 3,998,343 A | 12/1976 | Fors | |
| 4,015,727 A * | 4/1977 | Rezac | 414/521 |
| 4,082,196 A | 4/1978 | Lutz et al. | |
| 4,111,318 A | 9/1978 | Lutz | |
| 4,113,122 A | 9/1978 | Lutz | |
| 4,162,735 A | 7/1979 | Lewis | |
| 4,431,360 A | 2/1984 | Maeno | |
| 4,518,303 A | 5/1985 | Moser | |
| 4,664,583 A | 5/1987 | Gust | |
| 4,747,747 A | 5/1988 | Fusco et al. | |
| 4,770,290 A | 9/1988 | Erosket et al. | |
| 4,842,471 A | 6/1989 | Hodgetts | |
| 5,143,508 A | 9/1992 | Lutz et al. | |
| 5,171,122 A | 12/1992 | Pellegrino | |
| 5,314,290 A | 5/1994 | Lutz et al. | |
| 6,033,179 A | 3/2000 | Abbott | |
| 6,837,668 B1 | 1/2005 | Brown | |
| 7,147,423 B2 | 12/2006 | Golden et al. | |

FOREIGN PATENT DOCUMENTS

| CA | 895158 | 3/1972 |
|---|---|---|
| CA | 1031735 | 5/1978 |

(Continued)

*Primary Examiner* — Charles A Fox
(74) *Attorney, Agent, or Firm* — Mario Theriault (57) ABSTRACT

The light-weight live-floor module has a floor surface, parallel cables laid on the floor surface, a length of conveyor belt laid on the cables, a movable bulkhead and a winch system for moving the belt, the cables and the bulkhead back and forth in unison, such as a shuttle. The belt has just enough length to cover the return axis and the floor surface on which goods are transported, thereby reducing any unnecessary weight in the live floor structure. The cables and the belt are wrapped over different axes for eliminating relative movement between the cables and the belt. One axis is set higher than the floor surface for easily breaking static friction under the belt. In a method for breaking static friction between a conveyor belt and a floor surface, a first segment of the belt is jolted upwardly while tension is applied in the belt.

20 Claims, 6 Drawing Sheets

FOREIGN PATENT DOCUMENTS

| | | |
|---|---|---|
| DE | 34 13 528 | 10/1985 |
| JP | 60 018431 | 1/1985 |
| WO | WO 87/01996 | 4/1987 |
| WO | WO 2005/028248 | 3/2005 |

* cited by examiner

LIGHT-WEIGHT LIVE-FLOOR MODULE FOR TRAILERS

This application claims the benefit of U.S. Provisional Application No. 61/282,065 filed Dec. 10, 2009.

FIELD OF THE INVENTION

The present invention pertains to the field of live-bottom trailers, and more particularly it pertains to live-bottom trailers using a conveyor belt that is movable along the floor of the trailer, and cables mounted under the conveyor belt to reduce friction between the conveyor belt and the floor of the trailer.

BACKGROUND OF THE INVENTION

The live-bottom trailers that are of interest herein are used in road construction to haul sand, gravel, rocks, broken pavement and new asphalt. Live-bottom trailers having conveyor belts movable along the floors thereof also include agricultural trailers used for hauling potatoes and other vegetable or grains from a harvester. Known live-floor trailers also include highway transport trailers that are used for transporting dry freight in boxes and on pallets.

Common live-bottom trailers have a conveyor-type rubber belt sliding over the floor of the trailer for moving the content of the trailer toward the rear door of the trailer and for speeding up the unloading of the trailer. The same conveyor belt is also used for more easily loading the trailer. These highway trailers and semi-trailers can carry several tons of material.

Examples of these live-bottom trailers found in the prior art are described in the following documents:
U.S. Pat. No. 3,498,482 issued to M. Lewis on Mar. 3, 1970;
U.S. Pat. No. 3,593,864 issued to W. H. Moser on Jul. 20, 1971;
U.S. Pat. No. 3,704,798 issued to H. L. Carpenture, Jr. et al. on Dec. 5, 1972;
U.S. Pat. No. 3,722,717 issued to L. K. Stryczek on Mar. 27, 1973;
U.S. Pat. No. 3,888,366 issued to E. D. Prahst on Jun. 10, 1975;
U.S. Pat. No. 3,953,170 issued to J. O. Webb on Apr. 27, 1976;
U.S. Pat. No. 3,998,343 issued to V. E. Fors on Dec. 21, 1976;
U.S. Pat. No. 4,162,735 issued to M. Lewis on Jul. 31, 1979;
U.S. Pat. No. 4,431,360 issued to M. Maeno in Feb. 14, 1984;
U.S. Pat. No. 4,518,303 issued to W. H. Moser on May 21, 1985;
U.S. Pat. No. 4,664,583 issued to J. N. Gust on May 12, 1987;
U.S. Pat. No. 4,747,747 issued to S. M. Fusco et al. on May 31, 1988;
U.S. Pat. No. 4,842,471 issued to G. L. Hodgetts on Jun. 27, 1989;
U.S. Pat. No. 6,837,668 issued to D. J. B. Brown on Jan. 4, 2005;
U.S. Pat. No. 7,147,423 issued to R. Golden et al. on Dec. 12, 2006.

In another type of live-bottom trailers, the load inside the trailer is moved on steel cables that are laid along the floor of the trailer. In these applications, a conveyor belt is not used. The cables are pulled along the floor of the trailers by winches or hydraulic cylinders, for carrying the load over the floor surface. Because the total surface of the cables that is in contact with the floor of the trailer is smaller than the footprint of the load to be moved, and because there is a lesser coefficient of friction provided by the cables, the force required to overcome friction is considerably reduced.

Examples of trailers in the prior art, having parallel cables laid on the floor thereof are listed below:
U.S. Pat. No. 3,272,358 issued to F. Thompson on Sep. 13, 1966;
U.S. Pat. No. 4,082,196 issued to D. W. Lutz et al. on Apr. 4, 1978;
U.S. Pat. No. 4,111,318 issued to D. E. Lutz on Sep. 5, 1978;
U.S. Pat. No. 4,113,122 issued to D. E. Lutz on Sep. 12, 1978;
WO 87/01996 filed by Luigi Pellegrino, published on Apr. 9, 1987;
U.S. Pat. No. 5,171,122 issued to L. Pellegrino on Dec. 15, 1992.

A number of prior art documents also disclose movable bulkhead arrangements for pushing the content of a trailer all at once toward the rear door of the trailer. These documents are listed herein below for illustrating progress made in the art:
U.S. Pat. No. 2,606,677 issued to A. E. Snedeger on Aug. 12, 1952;
CA Patent 1,031,735 issued to H. D. Rezac on May 23, 1978;
U.S. Pat. No. 5,143,508 issued to D. E. Lutz et al. on Sep. 1, 1992;
U.S. Pat. No. 5,314,290 issued to D. E. Lutz et al. on May 24, 1994.

The various concepts described in the prior art have a common advantage of emptying a trailer in a more efficient manner. Although the advantages of a conveyor belt; a series of parallel cables moving on the bottom surface of a trailer, and a movable bulkhead are easy to appreciate, a combination of the three elements wherein the cables are used to move both the conveyor belt and the bulkhead, has not been seen in the prior art. This deficiency in the art may be explained by the challenges that this combination represents to designers and builders of these trailers.

One of the challenges encountered in the design and construction of a live-bottom trailer with floor cables mounted under a conveyor belt is a relative movement between the conveyor belt and the floor cables. This relative movement could causes the gouging of grooves in the bottom surface of the belt and can destroy the belt in a relatively short time.

Another challenge is a total weight of the combination. Truck owners are oftentimes paid by the ton of material transported. The weight of accessories mounted inside a trailer takes away available space and available cargo weight for that trailer. Therefore the advantages of a live-floor mechanism must have sufficient value to offset the losses in revenue from a reduction of cargo weight for that trailer.

It is believed that this weight restriction factor, primarily, has been a major impediment in the past for designing and building a live-bottom trailer having a conveyor belt; parallel cables mounted under the belt and a bulkhead that is movable with the belt and cables.

SUMMARY OF THE INVENTION

In the present invention, however, there is provided a light-weight live-floor module that has a floor surface, parallel cables laid on the floor surface, a length of conveyor belt laid on the cables, a movable bulkhead and mounting arrangements that provide an outstanding weight-efficiency ratio. As a result, the tension required to move a load on the belt is provided in great proportion by the cables and in a lesser extent by the belt.

In the following description of several aspects of the present invention, the scope of the invention should not be limited to a narrow interpretation of the elements described and to the exact parts illustrated in the drawings. Therefore, generic terminology is used herein where ever it is possible without reducing the clarity of the description. The expression "goods-carrying sheet" is used to designate a conveyor belt made of thick rubber with one or more plies; a conveyor belt made of interlinked metal links or mesh, or a belt made of fabric, fibreglass, nylon, webbing, canvas or similar flexible material. Similarly the word "pullers" should be understood as encompassing cables, ropes, strings, flat straps, chains, or other pulling elements having sufficient tensile strength to perform as expected. Also, the expression "return axis" is used to designate a roller, a pulley, a wheel or a static bumper on which a belt or a cable changes direction.

The expression "light-weight" is used herein because the load carried and pulled on the live-floor module is shared by both the conveyor belt, and to a greater extend, by the cable system. Because the tension in the belt is greatly reduced, the conveyor belt can be much lighter than in other conventional live-bottom trailers. Also the expression "live-floor module" is used herein because its applications are not limited to trailers. The present live-floor module can be used as a base on which a highway transport trailer is built. Similarly, the live-floor module can be used as a base for building straight-frame box trucks, gravel-type semi-trailers, or it can be used as a stand-alone conveyor on docks of warehouses for example for handling material in and out of transport trailers. The live-floor module described herein can also be scaled down for installation in cube vans and pickup trucks.

In one aspect of the present invention, there is provided a live floor comprising a sheet return axis mounted to an extremity thereof and a goods-carrying sheet having first and second ends. The goods-carrying sheet is wrapped over the sheet return axis, with the first end extending above a plane of the live floor and the second end extending below the aforesaid plane. There is also provided a mechanism connected to the first and second ends for moving the goods-carrying sheet about the sheet return axis for loading and unloading goods on the goods-carrying sheet.

The goods-carrying sheet has just enough length to cover the sheet return axis and the floor surface on which goods are transported, thereby reducing any unnecessary weight in the live floor structure. As it will be understood, the total length of the goods-carrying sheet is a same dimension or substantially a same dimension as the length of the live-floor module itself. Also the goods-carrying sheet in the live-floor module according to the present invention is made of a thinner and a lighter material than a same arrangement on a live-floor system of the prior art.

In another aspect of the present invention, there is provided a live-floor module comprising first and second spaced-apart return axes mounted side-by-side on an extremity thereof. A series of parallel pullers are laid on a surface of the live-floor module; and a goods-carrying sheet is laid on the parallel pullers. The pullers are affixed at their ends to extremities of the goods-carrying sheet. The pullers are wrapped over the first return axis and the goods-carrying sheet is wrapped over the second return axis. This arrangement is advantageous for eliminating relative movement between the goods-carrying sheet and the parallel pullers when the goods-carrying sheet and the parallel pullers move around the extremity of the live-floor module.

In yet another aspect of the present invention, there is provided a live-floor module comprising a floor surface; a roller mounted on an extremity of the floor surface; a series of parallel pullers laid on the floor surface, and a goods-carrying sheet laid on the parallel pullers. The pullers are affixed at their ends to extremities of the goods-carrying sheet. The pullers and the goods-carrying sheet are wrapped over the roller and the roller is mounted higher than the floor surface. When tension is applied to the pullers and to the goods-carrying sheet, the goods-carrying sheet is forced upwardly near the roller to break static friction between the goods-carrying sheet and the floor surface near the roller.

Yet in a further aspect of the present invention, there is provided a method for breaking static friction between a goods-carrying sheet and a floor surface. This method comprises the steps of jolting a first segment of the goods-carrying sheet upwardly, and simultaneously applying a tension in the goods-carrying sheet. Because the goods-carrying sheet and the pullers have some elasticity, the jolting movement mentioned above and the simultaneous tension in the goods-carrying sheet, set a longitudinal vibration that is propagated along the goods-carrying sheet to break static friction along the goods-carrying sheet and the floor surface.

The upward jolt breaks the static friction under the first segment of the goods-carrying sheet. The longitudinal tension between the first segment of the goods-carrying sheet and the floor surface is suddenly released. This tension is applied to a next segment which also causes static friction to break under that second segment, and so on until the entire goods-carrying sheet is set in motion. This phenomenon works equally well with goods-carrying sheets loaded with gravel or dry freight. Because of this initial upward jolt in the first segment of the goods-carrying sheet, the breaking of the static friction is effected in a peeling-like action with less force and less work than in the live-floors of the prior art.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

One embodiment of a light-weight live-floor module is illustrated in the attached drawings. In these drawings the same numerals are used to identify the same elements. In the drawings.

DETAILED DESCRIPTION OF THE PREFERRED EMBODIMENT

While this invention is susceptible of embodiment in many different forms, there is shown in the drawings and will be described in details herein one specific embodiment of a light-weight live-floor module for use in trailers and warehouses. It should be understood that the present disclosure is to be considered as one example of the principles of the invention and is not intended to limit the invention to the embodiment illustrated and described.

Figure 1:
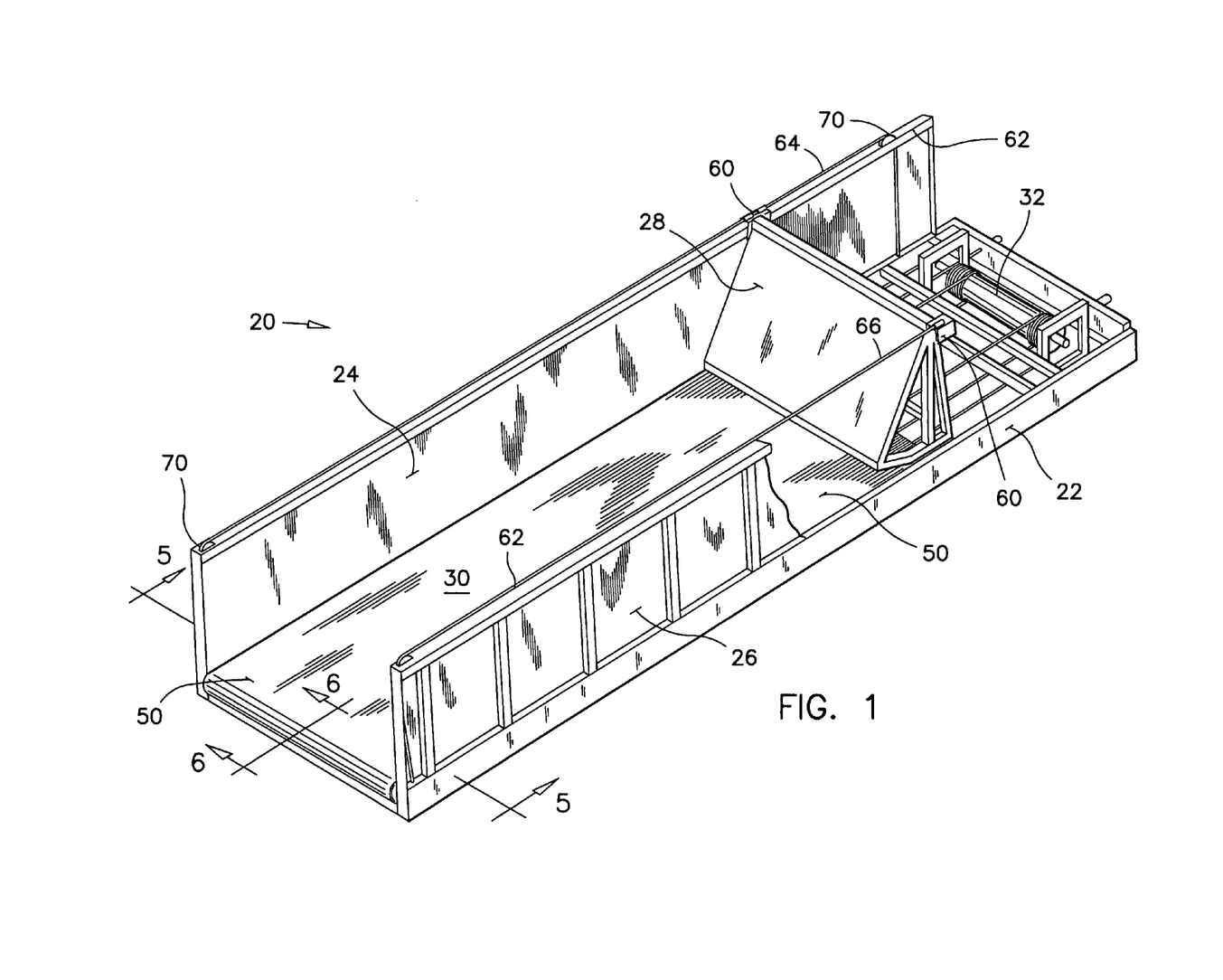
FIG. 1 illustrates a partial side, top and rear-end perspective view of the live-floor module according to the preferred embodiment of the present invention.

Referring firstly to FIG. 1, the preferred light-weight live-floor module 20 has a base 22, two side walls 24, 26, and a movable bulkhead 28. A live-floor system, generally designated as label 30 is incorporated into the base 22. In use, a load (not shown) is placed on the live-floor system 30 between the side walls 24, 26 and the bulkhead 28. A winch system 32 is mounted at the front end of the base 22 and it is used for moving the bulkhead 28 and the live floor toward the discharge end of the trailer and back.

In the illustration of FIG. 1, the bulkhead 28 is shown in an intermediate position along its trajectory. It should be understood that the bulkhead 28 can be retracted close to the winch system 32 such that the cargo space available between the side walls 24, 26 is a large as possible. In use, the bulkhead 28 is movable to the discharge end of the live-floor module 20 and back such as a shuttle.

It will be appreciated that the live-floor module 20 illustrated in the drawings can be equipped with an undercarriage of a semi-trailer or a transport trailer for example for hauling gravel or packaged freight. The live floor module 20 can also be mounted on a stationary support frame for use in a warehouse.

Referring now to FIGS. 1-6, additional structural details of the preferred live-floor system 30 will be explained.

The preferred live-floor system 30 comprises a plurality of spaced-apart parallel floor cables 34 that are attached at their ends to an upper draw bar 36 and to a lower draw bar 38 respectively. The attachment of the floor cables 34 to the draw bars 36, 38 is preferably done using crimped-on clevis and turnbuckle (not shown), but can also be done using other clamps and tighteners known in the field of cable ferrules and hardware.

The floor cables 34 are drawn tight between the draw bars 36, 38 and over respective return sheaves 40 at the discharge end of the base 22.

A length of conveyor belt 50 is drawn tight over the floor cables 34. The length of conveyor belt 50 is attached at its ends to the upper draw bar 36 and to the lower draw bar 38, respectively. The conveyor belt 50 is stretched over a return roller 52 at the discharge end of the base 22. The length of conveyor belt 50 is also movable back and forth with the bulkhead 28 such as a shuttle.

The floor cables 34 are supported directly over a hard floor surface 54, such as hardwood or most commonly, metal plates. The conveyor belt 50 is supported in a large portion by the floor cables 34. Preferably, the hard floor surface 54 has rails 56 encased therein under each floor cable 34. These rails 56 are made of a low friction material such as Teflon™. These rails 56 will be described again later when making reference to FIGS. 8-10.

It will be appreciated that when a load of dry goods on pallets is carried on the live-floor module 20, that load is supported entirely by the floor cables 34. When a load of gravel or other similar aggregate material is supported on the conveyor belt 50, the conveyor belt flexes and therefore, the belt is supported partly by the floor cables 34 and partly by the hard floor surface 54.

Figure 2:
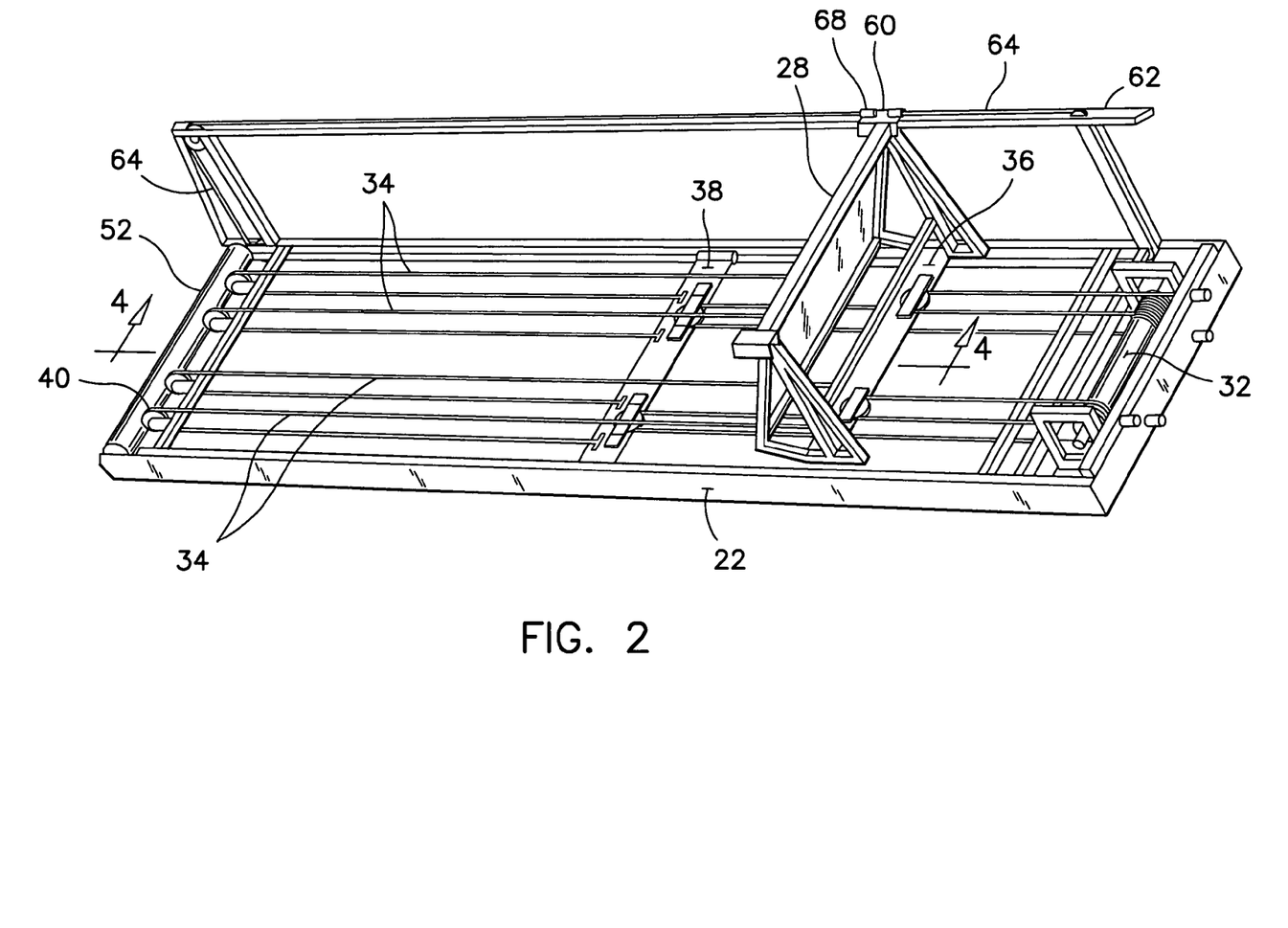
FIG. 2 is a partial side, top and front-end perspective view of the basic structure of the live-floor module according to the preferred embodiment of the present invention.
Figure 3:
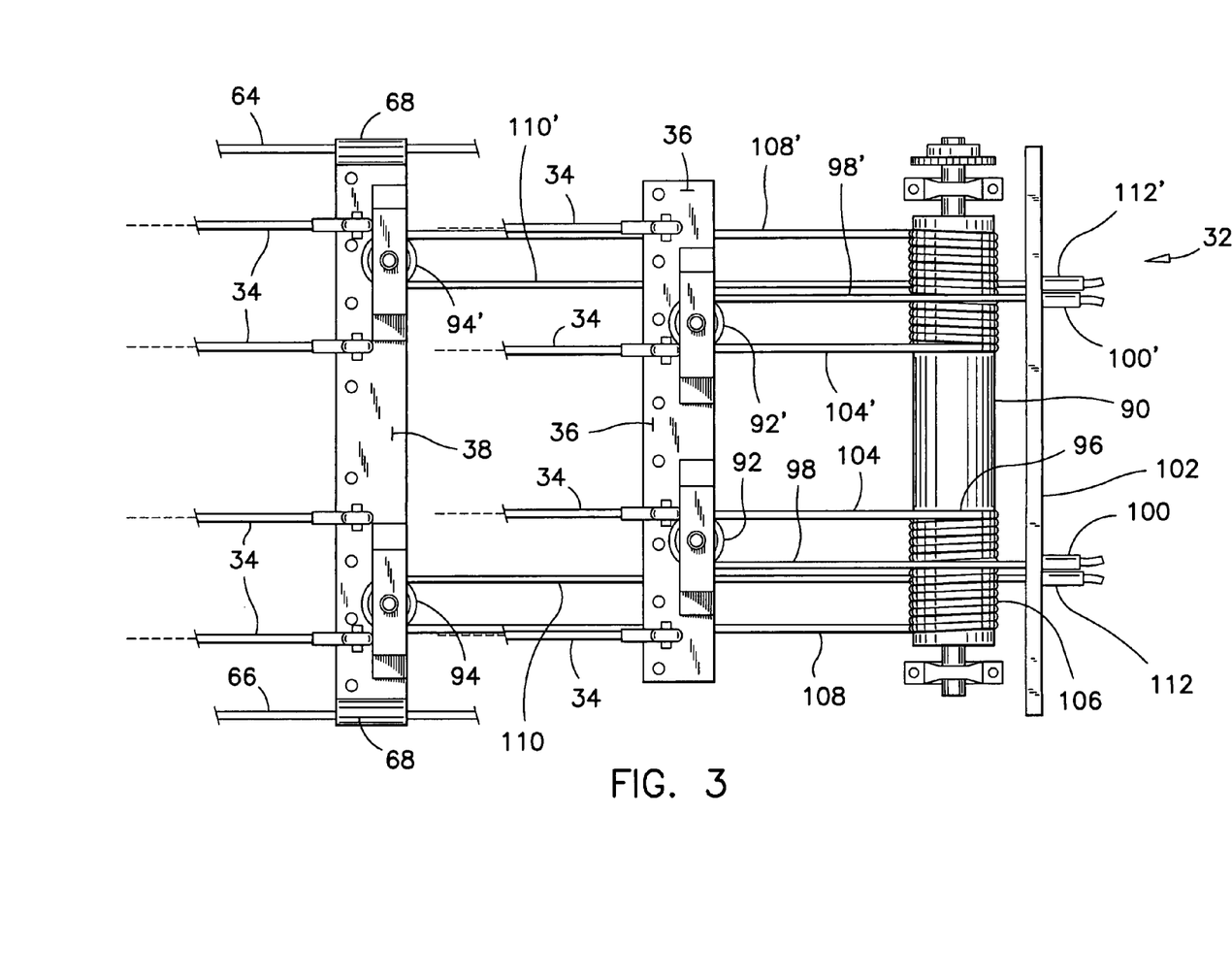
FIG. 3 is a top view of the winch system for pulling the cables and draw bar assemblies along the preferred live-floor module.
Figure 4:
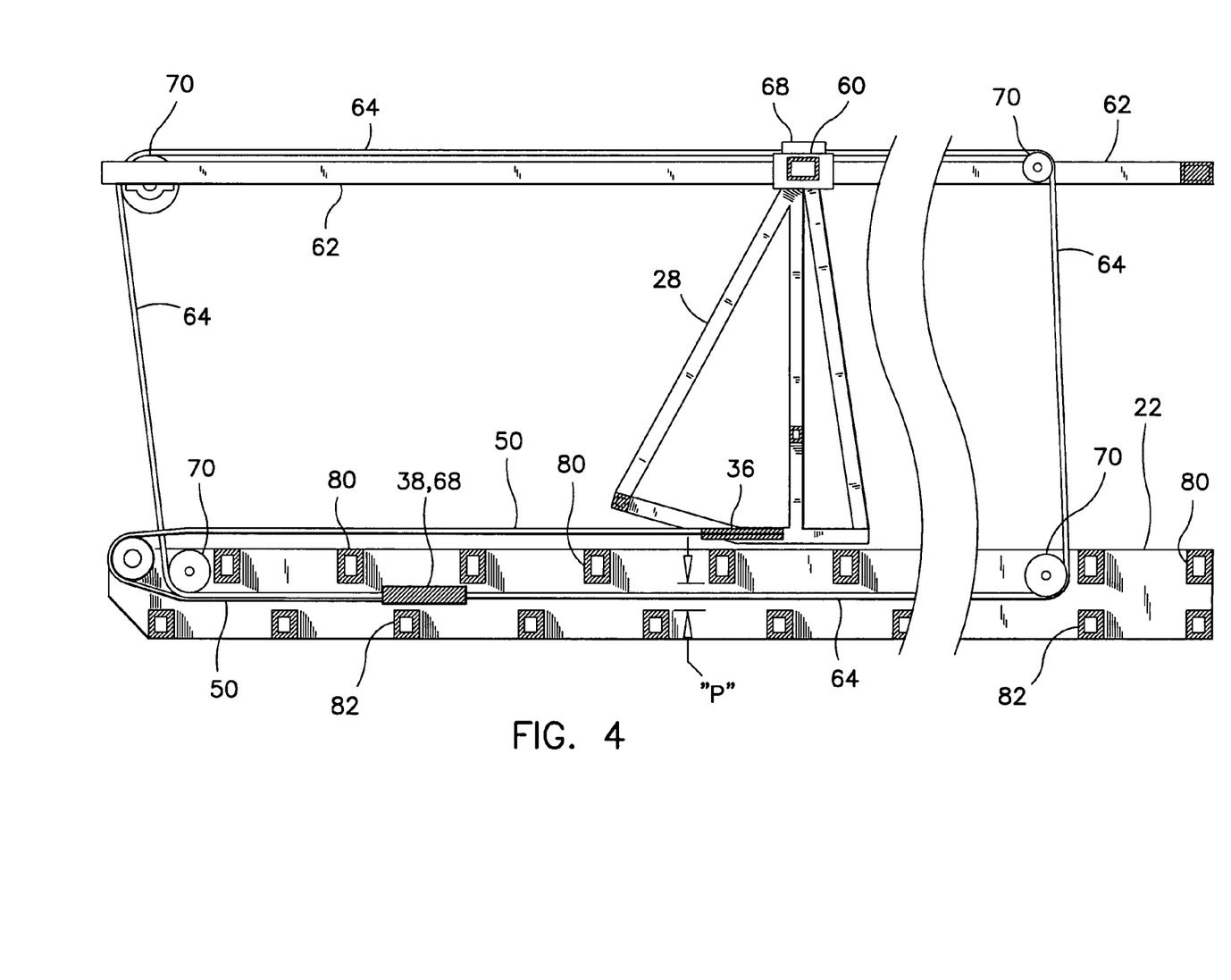
FIG. 4 is a partial longitudinal cross-section view of the basic structure of the preferred live-floor module, as seen substantially along line 4-4 in FIG. 2.
Figure 5:
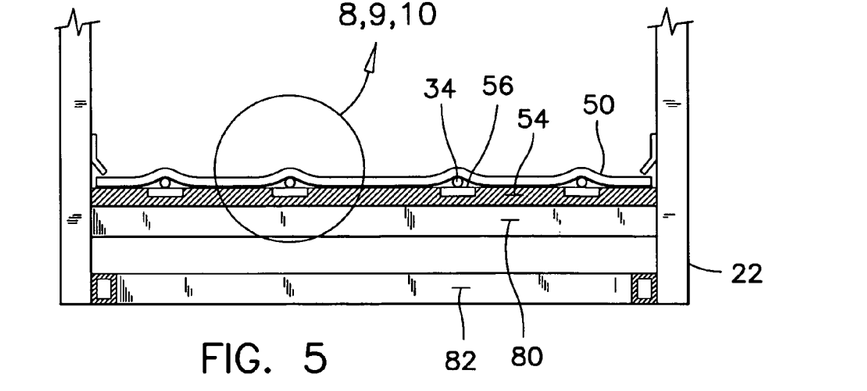
FIG. 5 is a partial transverse cross-section view of the live-floor module, as seen substantially along line 5-5 in FIG. 1.

Referring now to FIGS. 2, 3 and 4, the winch system 32 of the live-floor module 20 and other structural details will be explained.

Firstly, the bulkhead 28 is attached to the upper draw bar 36. The upper portion of the bulkhead 28 has two saddle members 60 that are movably mounted over upper longitudinal rails 62 on the side walls 24, 26, respectively. These saddle members 60 are fastened to a pair of guide cables 64, 66 by crimp-type connectors 68 for example. Each one of the guide cables 64, 66 extends around a respective one of the walls 24, 26, on sheaves 70 at each corner of the walls. The guide cables 64, 66 form closed loops and are also fastened by crimp-type connectors 68 or otherwise to the lower draw bar 38 for movement with the lower draw bar 38.

A displacement of the lower draw bar 38 entrains a similar movement of the saddle members 60 and the bulkhead 28 in the opposite direction. Because the bulkhead 28 is driven by the upper draw bar 36 at its lower end and it is driven by the guide cables 64, 66 at its top end, excessive strength in its structure is not required. The bulkhead 28 needs only to be made of relatively small structural members such that its weight is relatively light as compared to conventional bulkheads in trailers of the prior art. Also, the bulkhead 28 needs not to be guided in T-slots or otherwise in the base 22 of the live-floor system 30. Its attachments to the upper draw bar 36 and to the upper rails 62 are sufficient to fulfill its purpose.

Figure 6:
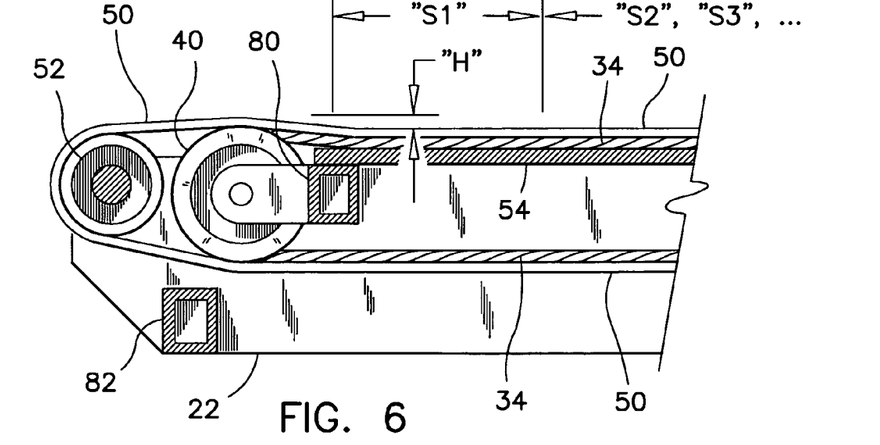
FIG. 6 is a cross-section view through the discharge end of the live-floor module as seen along line-6-6 in FIG. 1.

The base 22 of the live-floor system 20 is made of structural steel and has a passage "P" extending horizontally along its length. The return portion of the conveyor belt 50 and floor cables 34 extend along this passage "P", as can be seen in FIGS. 4 and 6.

The base 22 has upper cross members 80 extending across the upper portion thereof, and lower cross members 82 extending across the lower portion thereof. The base 22 has a gap between the upper cross members 80 and the lower cross members 82. This gap defines the passage "P". Other framing members are included in the base 22 to strengthen the base 22 against bending, twisting and skewing. These additional framing members have not been illustrated herein because they do not represent the focus of the present invention.

Because of the passage "P" and the mounting of the conveyor belt 50 and the lower draw bar 38 along this passage "P", the preferred live-floor module 20 is compact in thickness. The preferred live-floor module 20 is thereby usable as a modular floor for trucks. It is usable as an add-on floor that can be strapped onto a sub-floor and taken out when needed, or it can be used as a stand alone unit on a loading dock of a warehouse for example. It will also be appreciated that the preferred live-floor module 20 can be used without the bulkhead 28, or without the side walls 24, 26, or without both the bulkhead and side walls to handle dry goods on pallets for example.

The winch system 32 is illustrated in greater details in FIG. 3. The winch system 32 is also built for strength and light weight. The winch system 32 has two pulley systems mounted in tandem and each giving a mechanical advantage.

A first pulley system comprises a first pulley 92 mounted to the upper draw bar 36 and a second pulley 94 mounted to the lower draw bar 38. A first winch cable 96 has an end segment 98 tied to a shock absorber 100 that is mounted to a cross member 102 on the base 22. A second segment 104 which is continuous with the end segment 98 extends around the first pulley 92, and to the winch drum 90. It is wrapped several turns 106 around the winch drum 90. A third segment 108 continuous with the second segment 104 extends from the turns 106 on the winch drum 90 to the second pulley 94 mounted on the lower draw bar 38. A fourth segment 110 continuous with the third segment 108 extends around the second pulley 94 and through to the cross member 102 to a second shock absorber 112 that is mounted to the cross member 102.

The second pulley system is a mirror image of the first one, and therefore, it is illustrated using the same labels as in the first pulley system but with a prime symbol on each label.

Because there are two pulley systems mounted in tandem and each is giving a mechanical advantage, the components of the winch system 32 are smaller and lighter in weight than other winch system where a single cable arrangement would have been used.

Figure 7:
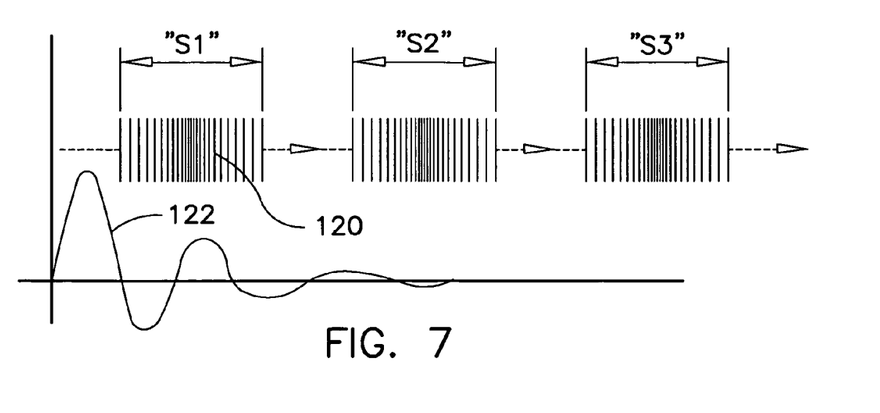
FIG. 7 is a graph illustrating the forces affecting the movement of the conveyor belt in the preferred live-floor module.

Referring now to FIGS. 6 and 7, two important aspects of the preferred live-floor module 20 will be explained. Firstly, the discharge end of the live-floor module 20 has a series of cable return pulleys 40 mounted along a same axis, and a belt return roll 52 that is mounted on a different axis than the series of cable return pulleys 40. The series of pulleys 40 and the roll 52 are also referred to herein in a broader sense as return axes.

The reason for this mounting using separate roll and pulley axes is to avoid damaging the underside of the belt by a relative movement and associated friction between the floor cables 34 and the underside of the conveyor belt 50. It will be appreciated that such damage would occur if a same axis would have been used.

Secondly, the upper segments of the cable-return pulleys 40 are set slightly higher than the floor surface 54 of the live-floor system 30. The cable-return pulleys 40 are set higher by a dimension "H" as illustrated in FIG. 6. A dimension "H" of about one half inch is sufficient for the intended purpose.

When tension is applied all at once in the floor cables 34 by the winch system 32 and by the lower draw bar 38, these floor cables 34 straighten up in a snap and cause a first segment "S1" of the conveyor belt 50 to be jolted upward. This sudden upward jolt has the effect of breaking static friction between the conveyor belt 50 and the floor surface 54 along at least the length of belt segment "S1". The segments "S1"; "S2"; "S3"; etc, as illustrated in the drawings are not drawn to scale, and are used simply to facilitate the description of a phenomenon that occurs in the live-floor module 20 in use.

It is important to indicate again that the conveyor belt 50 is under the same tension as in the floor cables 34 because of common attachments of the floor cables 34 and the conveyor belt 50 to the upper and lower draw bars 36, 38. It is also important to understand that both the conveyor belt 50 and the floor cables 34 have a substantial yield strength and elasticity. The presence of the cables 34 ensures that both the cables 34 and the conveyor belt 50 are not stretched beyond their respective elastic limit or yield strength, when an unloading phase of the live-floor module 20 is initiated.

In order to facilitate the following explanation, the horizontal tension in the conveyor belt 50 and in the floor cables 34 is represented by the bar-code-like symbols 120 in FIG. 7. The upward jolt given to the first segment "S1" of the conveyor belt 50 by the floor cables 34 is represented by the curve 122 in FIG. 7.

When the conveyor belt 50 is loaded with gravel for example, the upward jolt 122 given to the conveyor belt 50.*by* the floor cables 34 is quickly dampened as illustrated in FIG. 7. However, this upward jolt 122 and associated tension 120 in the floor cables 34 and in the conveyor belt 50 cause static friction under at least the first segment "S1" to be broken. Because kinetic friction is less than static friction, a large portion of the tension 120 in the conveyor belt 50 and in the floor cables 34 is then suddenly released from segment "S1" and applied to a next segment "S2".

The upward jolt 122 applied against the first segment "S1" is generated in a snap and the static friction under the first segment "S1" is also broken in a snap. The release of the static friction under the first segment "S1" generates a horizontal shock wave along the conveyor belt 50 that progressively moves as a flash along the conveyor belt 50.

Although the upward jolt 122 is quickly dampened by a load of aggregate material, the resulting horizontal shock wave 120 is only reduced by a difference between static and kinetic friction. As a result, static friction under the conveyor belt 50 is broken in a peeling motion without using great force in the conveyor belt 50. The conveyor belt 50 used in the preferred live-floor module 20 is thinner and lighter in weight than the conveyor belts in other live-floor modules not having floor cables thereunder.

Because the weight of a live-floor module is greatly affected by the thickness of the conveyor belt, a reduction in the belt thickness has a large effect on the total weight of the entire live-floor module. Because of the relatively low stress requirement in the conveyor belt 50, because of the lighter winch 32 and the light-framed bulkhead 28, it is estimated that a reduction in weight of 5,000-6,000 lbs., is achievable with the preferred live-floor module 20 as compared to live-floors of the prior art.

Figure 8:
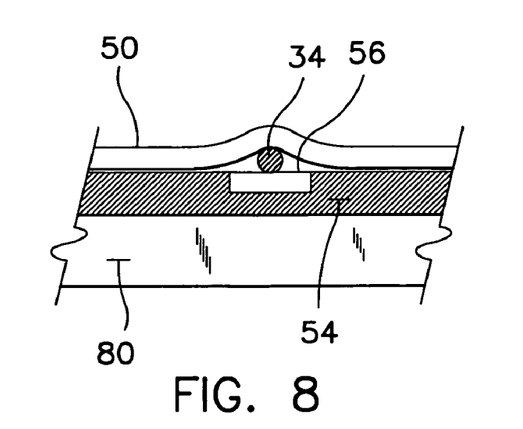
FIGS. 8, 9, and 10, are illustrations of other types of pullers that can be used under the conveyor belt in replacement of the floor cables in the preferred live-floor module.
Figure 9:
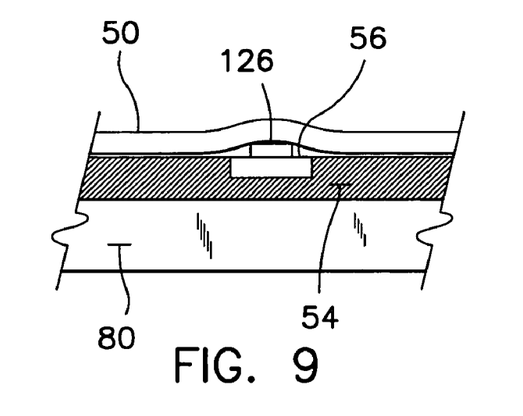
Figure 10:
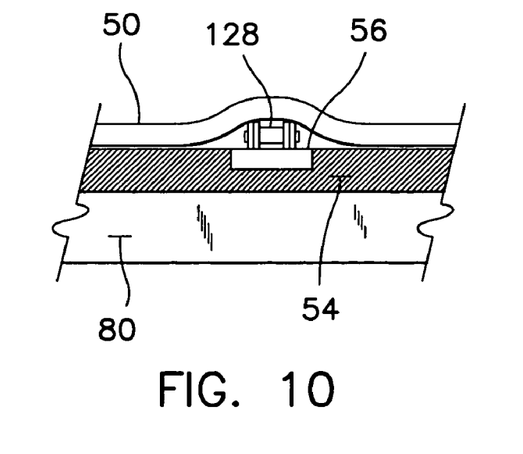

Another aspect of the preferred light-weight live-floor module 20 is explained in FIGS. 8, 9 and 10. Although the preferred live-floor module 20 has floor cables 34 that can be interpreted as being circular braided steel cables, it can be appreciated that equivalents pullers can be used to obtain similar advantages as the floor cables 34. Some of these equivalent pullers are flat straps 126 made of metal or plastic material, as shown in FIG. 9 or power-transmission chains 128 as shown in FIG. 10.

Other equivalents for other components are also possible and therefore, the components, dimensions mentioned herein and the accompanying illustrations should not be considered as limitation in the present invention.

What is claimed is:

1. A live floor comprising;
    a floor surface;
    an axis mounted to an extremity of said floor surface;
    a series of parallel pullers laid on said floor surface; each of said pullers having first and second ends;
    a goods-carrying sheet laid on top of said series of said parallel pullers, said goods-carrying sheet having first and second extremities;
    a first draw bar affixed to said first ends and to said first extremity and a second draw bar affixed to said second ends and to said second extremity; said goods-carrying sheet and said parallel pullers being wrapped over said axis, with said first draw bar extending there across above said floor surface and said second draw bar extending there across below said floor surface;
    said first and second draw bars being guided for movement back and forth relative to said axis in parallel alignments with said floor surface; and
    mechanism connected to said first and second draw bars for moving said first and second draw bars in opposite directions relative to each other and for moving said parallel pullers and said goods-carrying sheet about said axis for loading and unloading goods thereon.

2. The live floor as claimed in claim 1 wherein said axis is a roller.

3. The live floor as claimed in claim 1, wherein said mechanism is a winch.

4. The live floor as claimed in claim 1, wherein said goods-carrying sheet is a conveyor belt.

5. The live-floor as claimed in claim 4, having a length and wherein said conveyor belt has an overall dimension similar to said length.

6. The live-floor module as claimed in claim 1, wherein said parallel pullers are braided steel cables.

7. A live-floor module comprising;
   first and second spaced-apart axes mounted on an extremity thereof;
   a series of parallel pullers laid on a surface thereof;
   a goods-carrying sheet laid on said parallel pullers, said parallel pullers being affixed at their ends to extremities of said goods-carrying sheet,
   said parallel pullers being wrapped over said first axis and said goods-carrying sheet being wrapped over said second axis.

8. The live-floor module as claimed in claim 7, wherein said first axis is a roller an said second axis is a series of aligned pulleys.

9. The live-floor module as claimed in claim 8, further comprising a first and second draw bars and said ends and said extremities being affixed to said first and second draw bars.

10. The live-floor module as claimed in claim 9, further comprising a winch connected to said first and second draw bars for moving said first and second draw bars back and forth.

11. The live-floor module as claimed in claim 10, wherein said goods-carrying sheet is a rubber conveyor belt and said parallel pullers are braided steel cables.

12. The live-floor module as claimed in claim 11, further comprising a semi-trailer frame and undercarriage affixed thereto.

13. A live-floor module comprising;
    a floor surface;
    a roller mounted on an extremity of said floor surface;
    a series of parallel pullers laid on said floor surface;
    a goods-carrying sheet laid on said parallel pullers, said parallel pullers being affixed at their ends to extremities of said goods-carrying sheet;
    said parallel pullers and said goods-carrying sheet being wrapped over said roller and said roller being mounted with a segment thereof extending higher than said floor surface.

14. The live-floor module as claimed in claim 13, wherein said goods-carrying sheet is a rubber conveyor belt, said parallel pullers are steel cables, and said rubber conveyor belt and said steel cables having elasticity.

15. The live-floor module as claimed in claim 14, further comprising;
    a first and second draw bars and said ends and said extremities being
    affixed to said first and second draw bars, and
    a winch connected to said first and second draw bars for moving said first and second draw bars back and forth.

16. The live-floor module as claimed in claim 15, further comprising a stand-alone conveyor frame.

17. The live-floor module as claimed in claim 16, having a length, and wherein said rubber conveyor belt has an overall dimension similar to said length.

18. A method for breaking static friction between a goods-carrying sheet and a floor surface; said method comprising the steps of;
    supporting said goods-carrying sheet with cables and causing said cables and said goods-carrying sheet to elongate within elastic limits of said cables and said goods-carrying sheet;
    jolting a first segment of said goods-carrying sheet upwardly, and simultaneously applying a tension in said goods-carrying sheet.

19. The method as claimed in claim 18, wherein said step of applying a tension comprises applying a tension in said first segment.

20. The method as claimed in claim 18, further comprising the step of transmitting a vibration shock along said goods-carrying sheet from said first segment.

\* \* \* \* \*